(12) United States Patent
Hedrington et al.

(10) Patent No.: US 11,591,758 B2
(45) Date of Patent: Feb. 28, 2023

(54) WORK MACHINES AND SYSTEMS FOR MONITORING WEAR OF COMPONENTS OF WORK MACHINES

(71) Applicant: Caterpillar Paving Products Inc., Brooklyn, MN (US)

(72) Inventors: Mathew J. Hedrington, Ham Lake, MN (US); Ryan J. Schuette, Saint Michael, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 549 days.

(21) Appl. No.: 16/708,815

(22) Filed: Dec. 10, 2019

(65) Prior Publication Data

US 2021/0172130 A1    Jun. 10, 2021

(51) Int. Cl.
*E01C 19/48* (2006.01)
*G07C 3/12* (2006.01)
*B60Q 9/00* (2006.01)

(52) U.S. Cl.
CPC ............ *E01C 19/4873* (2013.01); *B60Q 9/00* (2013.01); *G07C 3/12* (2013.01); *E01C 2301/00* (2013.01)

(58) Field of Classification Search
CPC ... E01C 19/4873; E01C 2301/00; B60Q 9/00; G07C 3/12
USPC ...................... 404/72, 77, 79, 84.05, 95, 118
See application file for complete search history.

(56) References Cited

U.S. PATENT DOCUMENTS

| | | | |
|---|---|---|---|
| 9,238,491 | B1 | 1/2016 | Hakes et al. |
| 9,618,437 | B2 | 4/2017 | Marsolek et al. |
| 10,109,121 | B2 | 10/2018 | Aydin et al. |
| 10,316,476 | B2 * | 6/2019 | Marsolek ............... E01C 23/01 |
| 10,974,726 | B2 * | 4/2021 | Lachmann ......... B60W 30/1882 |
| 2003/0194273 | A1 * | 10/2003 | Lloyd ................... E01C 23/065 404/83 |
| 2014/0301782 | A1 * | 10/2014 | Mittleman .............. E01C 19/48 404/84.1 |
| 2017/0098198 | A1 | 4/2017 | Bullock |
| 2017/0287236 | A1 * | 10/2017 | Carlson ................ G07C 5/0816 |
| 2017/0356164 | A1 | 12/2017 | Recker et al. |
| 2018/0150055 | A1 | 5/2018 | Shapiro |

FOREIGN PATENT DOCUMENTS

DE        102016014984 A1    6/2018

* cited by examiner

*Primary Examiner* — Raymond W Addie
(74) *Attorney, Agent, or Firm* — Xsensus LLC

(57) ABSTRACT

A work machine includes a frame, one or more drive members coupled to the frame, an engine for providing power to the one or more drive members, one or more components coupled to the frame, and a monitoring system for monitoring wear of the one or more components. The system includes a user interface and a controller. The controller is in circuit communication with the user interface. The controller is configured to receive information inputted into the user interface by a user and send an alert notification regarding the servicing of at least one of the one or more components based on the received information.

18 Claims, 2 Drawing Sheets

WORK MACHINES AND SYSTEMS FOR MONITORING WEAR OF COMPONENTS OF WORK MACHINES

TECHNICAL FIELD

The present disclosure relates generally to a work machine, and more particularly relates to systems and methods for monitoring wear of components of the work machine.

BACKGROUND

Paving machines are generally used for laying paving materials, such as asphalt, on a work surface. The paving machine typically includes a screed system disposed behind the paving machine to receive the paving material from a hopper and deposit the paving material on the work surface. The screed system may include a screed plate for levelling the paving material with respect to the work surface. When the paving machine is used for a paving operation, the screed plate is in continuous contact with the paving material relative to the work surface. This contact between the screed plate and the paving material may cause wear of the screed plate. A worn screed plate on a paving machine can cause uneven levelling of the paving material on the work surface.

U.S. Pat. No. 9,618,437 ("the '437 patent") discloses a system for monitoring wear of screed plates of a paving machine. The system includes a sensor located on the screed plate and a controller coupled to the sensor. The sensor includes a resistor network having a plurality of electric resistors. As the bottom surface of the screed plate wears, the electric resistors of the resistor network are progressively removed, which changes the electrical resistance between a pair of electrical leads. The sensor generates signals indicative of wear of the screed plate based on the change in the electrical resistance of the resistor network. The controller receives signals from the sensor and determines the wear of the screed plate based on the received signals.

SUMMARY

An exemplary work machine includes a frame, one or more drive members coupled to the frame, an engine for providing power to the one or more drive members, one or more components coupled to the frame, and a monitoring system for monitoring wear of the one or more components. The system includes a user interface and a controller. The controller is in circuit communication with the user interface. The controller is configured to receive information inputted into the user interface by a user and send an alert notification regarding the servicing of the one or more components based on the information inputted by the user.

An exemplary paving machine includes a frame, one or more drive members coupled to the frame, an engine for providing power to the one or more drive members, one or more components coupled to the frame, and a monitoring system for monitoring wear of the one or more components. The one or more components include a screed plate. The system includes a user interface and a controller. The controller is in circuit communication with the user interface. The controller is configured to receive information inputted into the user interface by a user and send an alert notification regarding the servicing of the one or more components based on the information inputted by the user. The information inputted by the user includes at least one of a type of the paving material being engaged by the screed plate, a density of the paving material, an amount of the paving material, and a material of the screed.

An exemplary method for monitoring wear of one or more components of a work machine includes receiving information from a user interface relating to the one or more components of the work machine. The method further includes sending an alert notification regarding the servicing of at least one of the one or more components based on the received information.

DETAILED DESCRIPTION

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

The present application discloses work machines that include a system for monitoring wear on one or more components of the work machine. While the work machine is described as being a paving machine, it should be understood that the work machine can be any work machine that includes components that require service or replacement. For example, the work machine can be an off-highway truck, a railway locomotive, an earth-moving machine, such as a wheel loader, excavator, dump truck, backhoe, motor grader, material handler, or the like.

Figure 1:
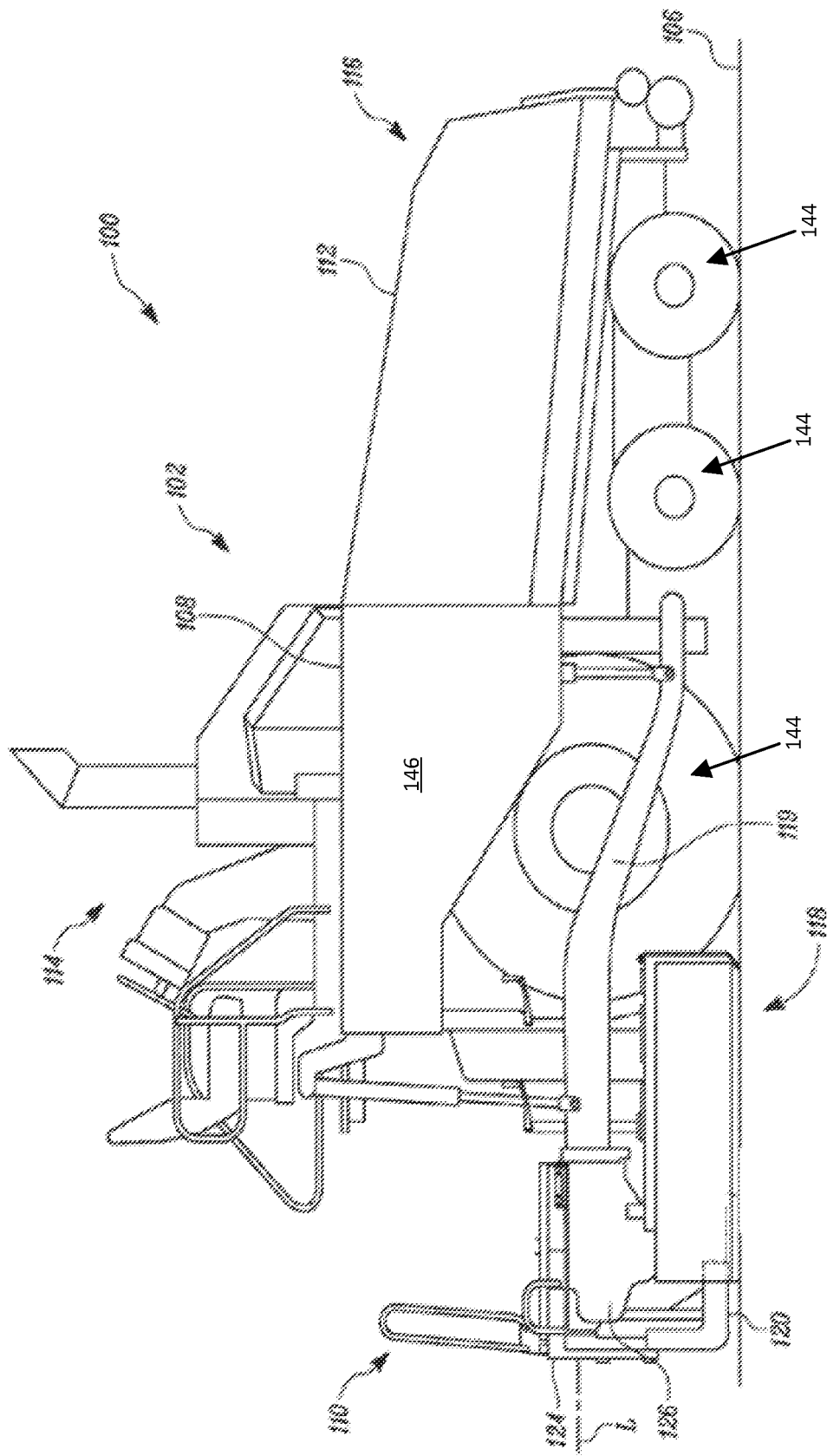
FIG. 1 is a side view of an exemplary embodiment of a work machine.

FIG. 1 illustrates a side view of a paving machine 100 that can be used for laying paving materials (e.g., asphalt, gravel, sand, concrete, etc.) on various work surfaces (e.g., roadways). In the illustrated embodiment, the paving machine 100 includes a tractor 102 to propel the paving machine 100. The tractor 102 may include one or more drive members 144 for providing traction to the tractor 102 with a work surface 106. In the illustrated embodiment, the tractor 102 is a wheel-type tractor in which the one or more drive members 144 are a plurality of wheels. In other embodiments, the tractor 102 may be a track-type tractor in which the one or more drive members 144 include tracks. The paving machine 100 may further include an engine 146 for propelling the tractor 102 and a generator coupled to the engine. The generator may be configured to supply electric power to various electric components of the paving machine 100.

The tractor 102 may include a frame 108 configured to support various components of the paving machine 100. In the illustrated embodiments, the components of the paving machine 100 include a screed system 110, a hopper 112, and an operator station 114. The hopper 112 is disposed adjacent to a front end 116 of the paving machine 100. The hopper 112 may be configured to receive the paving materials from a dump truck. The operator station 114 is disposed adjacent to a rear end 118 of the paving machine 100. The operator station 114 may include control levers and/or switches for an operator to control various operation (e.g., paving operations) of the paving machine 100. In certain embodiments, the paving machine 100 includes a monitoring system 230 (FIG. 2) having a user interface 234 (FIG. 2), which is described in more detail below.

In the illustrated embodiment, the screed system 110 is disposed adjacent to the rear end 118 of the paving machine 100 behind the operator station 114. In other embodiments, the screed system 110 may be coupled to the frame 108 adjacent to the front end 116 of the paving machine 100. The screed system 110 may be movably coupled to the frame 108 by a pair of arms 119 (only one arm 119 is shown in FIG. 1). The screed system 110 may be configured to receive paving material from the hopper 112 and deposit the paving material on to the work surface 106. The screed system 110 may be further configured to maintain a thickness for a layer of the deposited paving material with reference to the work surface.

The screed system 110 may be configured in a variety of ways. Any suitable configuration, whether known in the art or later developed, may be used. In certain embodiments, the screed system 110 includes a screed plate 120 and extension plates (not shown). Each of the extension plates may be disposed laterally with respect to the screed plate 120. In some embodiments, the screed system 110 includes a first support member 124 to support the screed plate 120 and second support members 126 to support the extension plates. The screed plate 120 and the extension plates are configured to contact the work surface 106 to level the deposited paving material on the work surface 106. In certain embodiments, the screed system 110 may include an arrangement for vibrating one or more elements of the screed system 110 to enhance distribution, leveling, and compaction of the paving material into a finished asphalt mat. The first support member 124 may be adjusted angularly about the longitudinal axis L and may be moved up and down based on the work surface 106 to position the screed plate 120 to define the layer of the asphalt on the work surface 106. The second support members 126 may also be adjusted in a vertical direction and a lateral direction relative to the frame 108 and the work surface 106 to position the extension plates to define the layer of the asphalt on the work surface 106.

Figure 2:
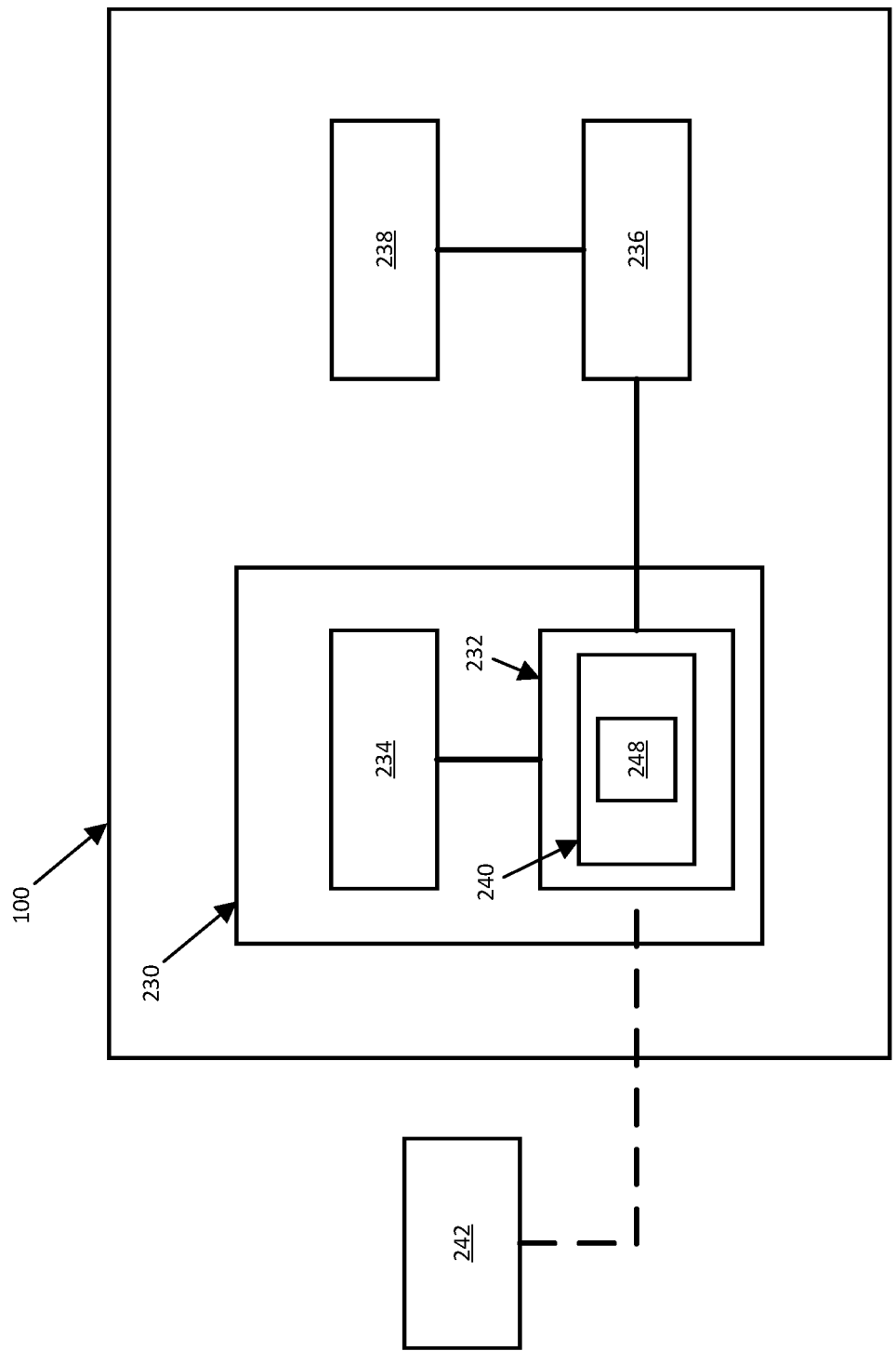
FIG. 2 is a partial schematic view of the work machine of FIG. 1.

Referring to FIG. 2, the paving machine 100 may further include a monitoring system 230 for monitoring wear on one or more components of the paving machine 100. For example, the system 230 can be used to monitor the components of the screed system 110, the conveyor floor, conveyor chains, conveyor flights, auger flights, tamper bars, nose bars, chain guards, or any other components of the paving machine 100. The monitoring system 230 may also be used to monitor undercarriage related components of a work machine (e.g., paving machine 100 or any other suitable work machine), such as, for example, MTS belts, tires, steel tracks, or any other component of an undercarriage that wears during use of the work machine.

In the illustrated embodiment, the system 230 includes a controller 232 and a user interface 234. The controller 232 is in circuit communication with the user interface 234 such that the controller 232 can receive information inputted into the user interface 234 by a user and send information regarding the one or more components of the paving machine 100 to the user interface 234. "Circuit communication" indicates a communicative relationship between devices. Direct electrical, electromagnetic and optical connections and indirect electrical, electromagnetic and optical connections are examples of circuit communication. In certain embodiments, two devices are in circuit communication if a signal from one is received by the other, regardless of whether the signal is modified by some other device.

A user can input information that is specific to the paving machine 100 being used and/or the jobsite in which the paving machine is being used. Non-limiting examples of the type of information the user may input include information regarding the type of material being used, the size of the aggregate of the material being used, the density of the material being used, the amount of material that the paving machine 100 can use before one or more components of the paving machine need serviced or replaced, the amount of hours a component can be used before it needs to be serviced or replaced, the amount of time a component has been used prior to being used on the specific jobsite, the type of material that the one or more components are made from (e.g., the material that the screed plate 120 is made from, the material a component of the conveyor system is made from, etc.), the size of the one or more components, information regarding the wear of the component due to the paving machine 100 being used at a previous jobsite, or other job-specific details regarding the use of the paving machine 100. In certain embodiments, a user may enter a wear rate of a component (i.e., the number of hours a component can be used before it needs to be serviced or replaced) based on a particular application in which the paving machine 100 will be used (e.g., based on the input information described above). For example, since the wear rate for a component may be different based on the type of paving material that is being used, a user can enter a wear rate for a component based on the type of material that is being used. In various instances, multiple information inputs are used to determine the wear rate of a component. For example, the wear rate for a screed plate 120 may be based on the wear of the screed plate due to previous use of the paving machine 100, the type of material that the screed plate 100 is made from, the size of the screed plate, the density of the paving material be distributed from the paving machine 100, and the amount of paving material being distributed from the paving machine 100.

In certain embodiments, the controller 232 may be in circuit communication with one or more sensors 236 that are configured to monitor operational data from one or more components 238 (e.g., components of the screed system 110, components of the material conveyance system between hopper 112 and screed system 110, etc.) of the paving machine 100, as well as monitor data of the jobsite in which the paving machine 100 is being used. For example, the sensors 236 can be configured to detect when the paving machine 100 is paving and not paving, the amount of material that is disposed from the paving machine 100, the distance the paving machine 100 has moved, various parameters of the jobsite (e.g., temperature), or any other data relating to the use of the paving machine 100.

In various embodiments, the controller 232 includes a processor 240 that is operable (e.g., using software) to analyze the data inputted by the user into the user interface 234 and the data obtained by the one or more sensors 236 to determine if a component of the paving machine 100 needs to be serviced or replaced. "Software," as used herein, includes but is not limited to one or more processor readable and/or executable instructions that cause a processor or other electronic device to perform functions, actions, and/or behave in a desired manner. The instructions may be embodied in various forms such as routines, algorithms, modules or programs including separate applications or code from dynamically linked libraries.

In certain embodiments, the processor 240 can be configured to manipulate the data to determine whether component(s) of the paving machine 100 needs to be serviced or replaced, and to report information regarding the component(s) to a user via the user interface 234. The processor 240 may send an alert notification (e.g., a visual message or indicator, such as a flashing light, or any other suitable notification) to the user to alert the user that a component of the paving machine 100 needs to be serviced or replaced. The processor 240 may send the alert notification through the user interface 234 or any other suitable means. In some embodiments, the processor sends an alert notification to indicate to a user that the one or more components need to be replaced within a specific amount of time (e.g., within the next 100 hours). The processor 240 and user interface 234 may be configured such that the remaining life of a component is displayed on the user interface 234. For example, the remaining life may be displayed as the remaining service life in hours or a percentage, a visual bar (e.g., a bar similar to the battery life shown on a cellular telephone) that informs a user of the remaining life of a component, or any other suitable way to display remaining life.

Still referring to FIG. 2, in certain embodiments, the processor 240 includes a memory 248 that stores information relevant to one or more components 238 of the paving machine 100. For example, a user can enter jobsite specific information (e.g., material being used, temperature, etc.) into the user interface and the processor 240 can store the information into the memory 248 to be used to determine the expected service or replacement time period for the component(s) based on the information stored. In some embodiments, the memory 248 is configured to accumulate data relating to one or more components (e.g., data related to the wear rate of one or more components) such that the processor 240 can use the accumulated data for future modeling by the monitoring system 230.

In certain embodiments, the controller 232 is in circuit communication with an off-board display device 242 that is remote from the paving machine 100. In these embodiments, the controller 232 is operable to report information to a remote user. The off-board display device 242 may be located at a jobsite or may be located remote from the jobsite.

In various embodiments, the controller 232 is operable to provide part numbers for a replacement component(s) of the paving machine 100 or a part(s) required to service a component of the paving machine 100 to a user such that the user can order the component(s) or part(s). That is, the memory 248 of the processor 240 can be configured to store component-specific information (e.g., the part or component number) such that the processor 240 can send the component-specific information to the user interface 234 and/or the off-board display device 242 with the alert notification that a component(s) needs serviced or replaced. In some embodiments, the controller 232 is also configured to automatically order the new part(s) or component(s) upon sending the alert notification to the user interface 234 and/or the off-board display device 242.

INDUSTRIAL APPLICABILITY

The disclosed paving machine 100 includes a system 230 for monitoring wear on one or more components of the paving machine 100. Referring to FIG. 2, the system 230 includes a controller 232 and a user interface 234. The system 230 allows a user to input information that is specific to the paving machine 100 being used and/or the jobsite in which the paving machine is being used, and the controller 232 of the system 230 is configured to determine if one or more components of the paving machine need to be serviced or replaced based on the information inputted by the user. The system 230 may also be configured to send an alert notification to the user when a component of the paving machine 100 need to be serviced or replaced.

The system 230 is advantageous because the system 230 allows a user to monitor the wear of one or more components of the paving machine 100 (or any other suitable work machine) based on a machine-specific and/or jobsite-specific information. That is, paving machines typically include several components that are subject to wear during operation. Non-limiting examples of components of a paving machine that may be subject to wear include the conveyor floor, conveyor chains, conveyor flights, auger flights, screed plates, tamper bars, nose bars, chain guards, tires, steel tracks, and rubber tracks of undercarriage system.

The service life of these components depend on multiple factors, such as, for example, the type of material being used, the type of use of the machine, the configuration of the machine, the jobsite on which the machine is being used, and various other factors. Monitoring the wear of the various components of a paving machine based on factors that are specific to the machine and/or the jobsite improves the performance of the machine, as well as prevents the waste of time and costs in servicing the machine.

For example, a method of monitoring wear of one or more components of a paving machine may include inputting information into a user interface of the paving machine, in which the information is specific to the work machine being used, specific to the paving material being used, and/or specific to the jobsite in which the paving machine is being used. The method may further include determining that a component of the paving machine needs to be serviced or replaced based on the information inputted into the user interface. In various embodiments, the determination that a component of the paving machine needs to be serviced or replaced may also be based on information stored in a memory of the monitoring system.

In a more specific example, a method of monitoring wear of a screed plate of a paving machine may include inputting information into a user interface of the paving machine, in which the information relates to at least one of the type of paving material being used, the density of the paving material being used, the amount of the paving material being used, the material of the screed plate, the size of the screed plate, or any other information specific to the paving machine or the screed plate. The method may further include determining that the screed plate needs to be serviced or replaced based on the information inputted into the user interface.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

ELEMENT LIST

| Element Number | Element Name |
|---|---|
| 100 | paving machine |
| 102 | tractor |
| 106 | work surface |
| 108 | frame |
| 110 | screed system |
| 112 | hopper |
| 114 | operator station |
| 116 | front end |
| 118 | rear end |
| 119 | arm |
| 120 | screed plate |
| 124 | first support member |
| 126 | second support member |
| 144 | drive members |
| 146 | engine |
| 230 | monitoring system |
| 232 | controller |
| 234 | user interface |
| 236 | sensor |
| 238 | one or more components |
| 240 | processor |
| 242 | display device |
| 248 | memory |

The invention claimed is:

1. A work machine; comprising:
a frame;
one or more drive members coupled to the frame;
an engine to provide power to the one or more drive members;
one or more components coupled to the frame; and
a monitoring system to monitor wear of the one or more components, the monitoring system including:
a user interface; and
a controller in circuit communication with the user interface,
wherein the controller is configured to
receive information inputted into the user interface by a user that is specific to the work machine, and
send an alert notification regarding servicing of the one or more components based on the information inputted by the user that is specific to the work machine,
wherein the information inputted into the user interface that is specific to the work machine includes a wear rate of each of the one or more components, and
wherein the alert notification indicates one or both of (a) that at least one of the one or more components should be replaced within a specific time period and (b) a remaining life of said at least one of the one or more components.

2. The work machine according to claim 1, wherein the controller of the monitoring system is configured to send the alert notification to the user when the controller determines that an amount of wear of said at least one of the one or more components exceeds a predetermined threshold.

3. The work machine according to claim 1,
wherein the monitoring system further includes one or more sensors to monitor operational data of the one or more components, and
wherein the one or more sensors are in circuit communication with the controller.

4. The work machine according to claim 3,
wherein the controller includes a processor that is configured to analyze the information inputted by the user that is specific to the work machine and the operational data obtained by the one or more sensors, and
wherein the controller is configured to send the alert notification based on both the information inputted by the user that is specific to the work machine and the operational data obtained by the one or more sensors.

5. The work machine according to claim 4, wherein the processor includes a memory configured to store information of the one or more components.

6. The work machine according to claim 1,
wherein the work machine is a paving machine, and
wherein the one or more components comprise a screed plate.

7. The work machine according to claim 6, wherein the information inputted by the user that is specific to the work machine includes a type of paving material being used by the paving machine.

8. The work machine according to claim 1, wherein the alert notification includes part replacement information for said at least one of the one or more components.

9. The work machine according to claim 1,
wherein the controller is configured to send the alert notification to the user interface, and
wherein the alert notification is a visual indicator.

10. A paving machine, comprising:
a frame;
one or more drive members coupled to the frame;
an engine to provide power to the one or more drive members;
one or more components coupled to the frame, the one or more components including a screed plate configured to engage paving material; and
a monitoring system monitor wear of the one or more components, the monitoring system including:
a user interface; and
a controller in circuit communication with the user interface, wherein the controller is configured to
receive information inputted into the user interface by a user that is specific to the paving machine and the paving material, and
send an alert notification regarding servicing of the one or more components based on the information inputted by the user that is specific to the paving machine and the paving material,
wherein the information inputted by the user that is specific to the paving machine and the paving material includes at least one of a type of the paving material, a density of the paving material, an amount of the paving material, and a material of the screed plate, and
wherein the alert notification indicates one or both of (a) that at least one of the one or more components should be replaced within a specific time period and (b) a remaining life of said at least one of the one or more components.

11. The paving machine according to claim 10, wherein the controller of the monitoring system is configured to send the alert notification to the user responsive to the controller determining that an amount of wear of said at least one of the one or more components exceeds a predetermined threshold.

12. The paving machine according to claim 10,
wherein the monitoring system further includes one or more sensors to monitor operational data of the one or more components, and
wherein the one or more sensors are in circuit communication with the controller.

13. The paving machine according to claim 12,
wherein the controller includes a processor that is configured to analyze the information inputted by the user that is specific to the work machine and the paving material and data obtained by the one or more sensors, and
wherein the controller is configured to send the alert notification based on both the information inputted by the user that is specific to the work machine and the paving material and the data obtained by the one or more processors.

14. The paving machine according to claim 12,
wherein the processor includes a memory configured to store information of the one or more components.

15. The work machine according to claim 10,
wherein the controller is configured to send the alert notification to the user interface, and
wherein the alert notification is a visual indicator.

16. A method of monitoring rear of one or more components of a work machine, the method comprising:
receiving, at a processor, information from a user interface relating to the one or more components of the work machine and relating to paving material to be processed by the work machine; and
sending, using the processor, an alert notification regarding servicing of at least one of the one or more components based on the received information relating to the one or more components of the work machine and relating to paving material to be processed by the work machine,
wherein the information relating to the one or more components includes a wear rate of each of the one or more components, and
wherein the alert notification indicates one or both of (a) that at least one of the one or more components should be replaced within a specific time period and (b) a remaining life of said at least one of the one or more components.

17. The method according to claim 16,
wherein the work machine is a paving machine, and
wherein the one or more components comprise a screed plate.

18. The method according to claim 16,
wherein a controller sends the alert notification to the user interface, and
wherein the alert notification is a visual indicator.

* * * * *